United States Patent [19]
Bakis et al.

[11] Patent Number: 6,023,673
[45] Date of Patent: Feb. 8, 2000

[54] HIERARCHICAL LABELER IN A SPEECH RECOGNITION SYSTEM

[75] Inventors: Raimo Bakis, Brewster; David Nahamoo; Michael Alan Picheny, both of White Plains, all of N.Y.; Jan Sedivy, Praha, Czech Rep.

[73] Assignee: International Business Machines Corporation, Armonk, N.Y.

[21] Appl. No.: 08/869,061

[22] Filed: Jun. 4, 1997

[51] Int. Cl.[7] .................................. G10L 5/06; G10L 9/00
[52] U.S. Cl. ............................ 704/231; 704/236; 704/243
[58] Field of Search ...................................... 704/231, 243, 704/254, 236

[56] References Cited

U.S. PATENT DOCUMENTS

| | | |
|---|---|---|
| 4,817,156 | 3/1989 | Bahl et al. . |
| 4,819,271 | 4/1989 | Bahl et al. . |
| 4,876,720 | 10/1989 | Kaneko et al. . |
| 5,033,087 | 7/1991 | Bahl et al. . |
| 5,072,452 | 12/1991 | Brown et al. . |
| 5,165,007 | 11/1992 | Bahl et al. . |
| 5,182,773 | 1/1993 | Bahl et al. . |
| 5,222,146 | 6/1993 | Bahl et al. . |
| 5,278,942 | 1/1994 | Bahl et al. . |
| 5,280,562 | 1/1994 | Bahl et al. . |
| 5,522,011 | 5/1996 | Epstein et al. . |
| 5,729,656 | 3/1998 | Nahamoo et al. ....................... 704/254 |

Primary Examiner—David R. Hudspeth
Assistant Examiner—Robert Louis Sax
Attorney, Agent, or Firm—F. Chau & Associates, LLP

[57] ABSTRACT

A speech coding apparatus and method uses a hierarchy of prototype sets to code an utterance while consuming fewer computing resources. The value of at least one feature of an utterance is measured during each of a series of successive time intervals to produce a series of feature vector signals representing the feature values. A plurality of level subsets of prototype vector signals is computed, wherein each prototype vector signal in a higher level subset is associated with at least one prototype vector signal in a lower level subset. Each level subset contains a plurality of prototype vector signals, with lower level subsets containing more prototypes than higher level subsets. The closeness of the feature value of the first feature vector signal is compared to the parameter values of prototype vector signals in the first level subset of prototype vector signals to obtain a ranked list of prototype match scores for the first feature vector signal and each prototype vector signal in the first level subset. The closeness of the feature value of the first feature vector signal is compared to the parameter values of each prototype vector signal in a second (lower) level subset that is associated with the highest ranking prototype vectors in the first level subset, to obtain a second ranked list of prototype match scores. The identification value of the prototype vector signal in the second ranked list having the best prototype match score is output as a coded utterance representation signal of the first feature vector signal.

23 Claims, 2 Drawing Sheets

HIERARCHICAL LABELER IN A SPEECH RECOGNITION SYSTEM

CROSS REFERENCE TO RELATED APPLICATIONS

U.S. Pat. No. 5,522,011, issued on May 28, 1996 and commonly owned by the present assignee, is incorporated herein by reference.

BACKGROUND OF THE INVENTION

The invention relates to speech coding, such as for computerized speech recognition systems.

In computerized speech recognition systems, an acoustic processor measures the value of at least one feature of an utterance during each of a series of successive time intervals to produce a series of feature vector signals representing the feature values. For example, each feature may be the amplitude of the utterance in each of twenty different frequency bands during each of a series of 10-millisecond time intervals. A twenty-dimension acoustic feature vector represents the feature values of the utterance for each time interval.

In discrete parameter speech recognition systems, a vector quantizer replaces each continuous parameter feature vector with a discrete label from a finite set of labels. Each label identifies a prototype vector signal having one or more parameter values. The vector quantizer compares the feature values of each feature vector signal to the parameter values of each prototype vector signal to determine the best matched prototype vector signal for each feature vector signal. The feature vector signal is then replaced with the label identifying the best-matched prototype vector signal.

For example, for prototype vector signals representing points in an acoustic space, each feature vector signal may be labeled with the identity of the prototype vector signal having the smallest Euclidean distance to the feature vector signal. For prototype vector signals representing Gaussian distributions in an acoustic space, each feature vector signal may be labeled with the identity of the prototype vector signal having the highest likelihood of yielding the feature vector signal. This label may be selected from a ranked list of most likely prototypes. It is to be understood that a group of the closest prototypes (i.e., prototype vector signals having the smallest distance to the feature vector signal or the prototype vector signal having the highest likelihood of yielding the feature vector signal) is collectively referred to as a leaf, whereby the closest prototype in the leaf gives the likelihood for calculating the overall rank associated with the leaf. Further, the list of ordered closest leaves may be referred to as a rank vector or, simply, a rank.

For large numbers of prototype vector signals and sub-prototype vector signals (for example, several thousand), comparing each feature vector signal to each prototype vector signal consumes significant processing resources by requiring many time-consuming computations.

SUMMARY OF THE INVENTION

It is an object of the invention to provide a speech coding apparatus and method for labeling an acoustic feature vector signal with the identification of the best-matched prototype vector signal and, preferably, the identification of the N-best prototypes while consuming relatively few processing resources.

It is another object of the invention to provide a speech coding apparatus and method for labeling an acoustic feature vector signal with the identification of the best-matched prototype vector signal and, preferably, the identification of the N-best prototypes without comparing each feature vector signal to all prototype vector signals.

In one aspect of the invention, a method for assigning a label to a segment of speech to be recognized comprises the steps of: providing a hierarchical fast ranking tree comprising a plurality of levels of subsets of prototypes, each prototype in a higher level subset being associated with one or more prototypes in a lower level subset; inputting a feature vector signal representing the segment of speech to be recognized; comparing the features of the vector signal with the features of the prototypes in a first level to find a first ranked list of the closest prototypes to it at that level; comparing the features of the feature vector signal to the prototypes in a second level subset associated with the highest ranking prototypes in the first ranked list of prototypes, to find a second ranked list of the closest prototypes to the feature vector signal in the second level; assigning the label associated with the highest ranking prototype in the lowest level subset to the feature vector signal. It is to be understood that in an alternative method of the present invention, a rank of leaves with the N-best prototypes may be produced. Also, it is to be appreciated that the present invention may include M hierarchical levels for performing the determination of the best match(es) and, therefore, is not limited to any particular number of levels, such as in the example described above employing only three levels.

In another aspect of the invention, the label assignment method preferably includes arranging the prototypes in the plurality of levels by: organizing all prototypes in an existing set of a large number of prototypes into a binary search tree terminating in a plurality of leaves by splitting all prototypes into at least two sets of prototypes based upon a Kullback-Leibler distance measure; continuing to split the set of prototypes until every leaf of the tree represents one prototype; assigning the prototypes in the lowest level of the tree to the third level subset, the prototypes in a higher level of the tree to the second level subset, and the prototypes in a next higher level of the tree to the first level subset.

In yet another aspect of the invention, the label assignment method preferably includes the step of predictive labeling wherein the highest ranking prototype in the lowest level subset is assigned to a second feature vector signal which represents another segment of speech to be recognized if a distance between the second feature vector signal and the first feature vector signal is at least less than a predetermined threshold.

In a further aspect of the invention, the label assignment method of the invention preferably includes referring to a group of closest prototypes as a leaf and referring to a list of ordered closest leaves as a rank. Further, the method may include each level of the hierarchical fast ranking tree having at least one rank associated therewith and, preferably, wherein ranks calculated for higher levels of the hierarchical fast ranking tree are used to estimate ranks for the lower levels of the hierarchical fast ranking tree.

In still a further aspect of the invention, the label assignment method preferably provides that each prototype includes a plurality of elements, each element being represented by a Gaussian density distribution including a mean value and a variance value and, preferably, the method further includes respectively splitting the prototypes into bands wherein each band contains the mean values and the variance values of one or more elements of the particular prototype having substantially similar Gaussian density distributions with respect to each other.

DETAILED DESCRIPTION OF PREFERRED EMBODIMENTS

It is to be appreciated that any general reference to the term vector (e.g., feature vector, prototype vector, etc.) is intended to connotate, more specifically, a vector signal (e.g., feature vector signal, prototype vector signal, etc.).

Figure 1:
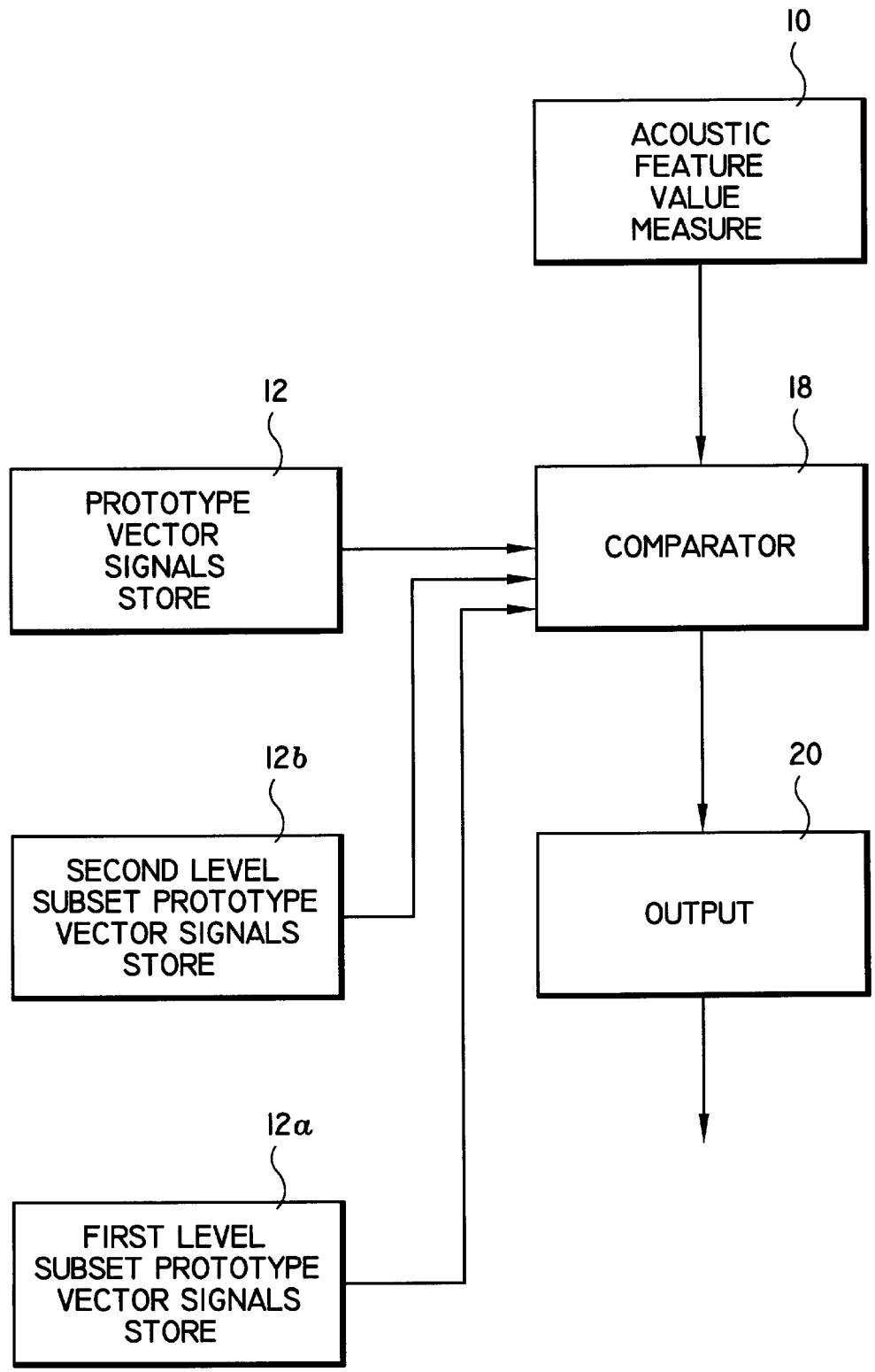
FIG. 1 is a block diagram of a system in accordance with the invention.
Figure 2:
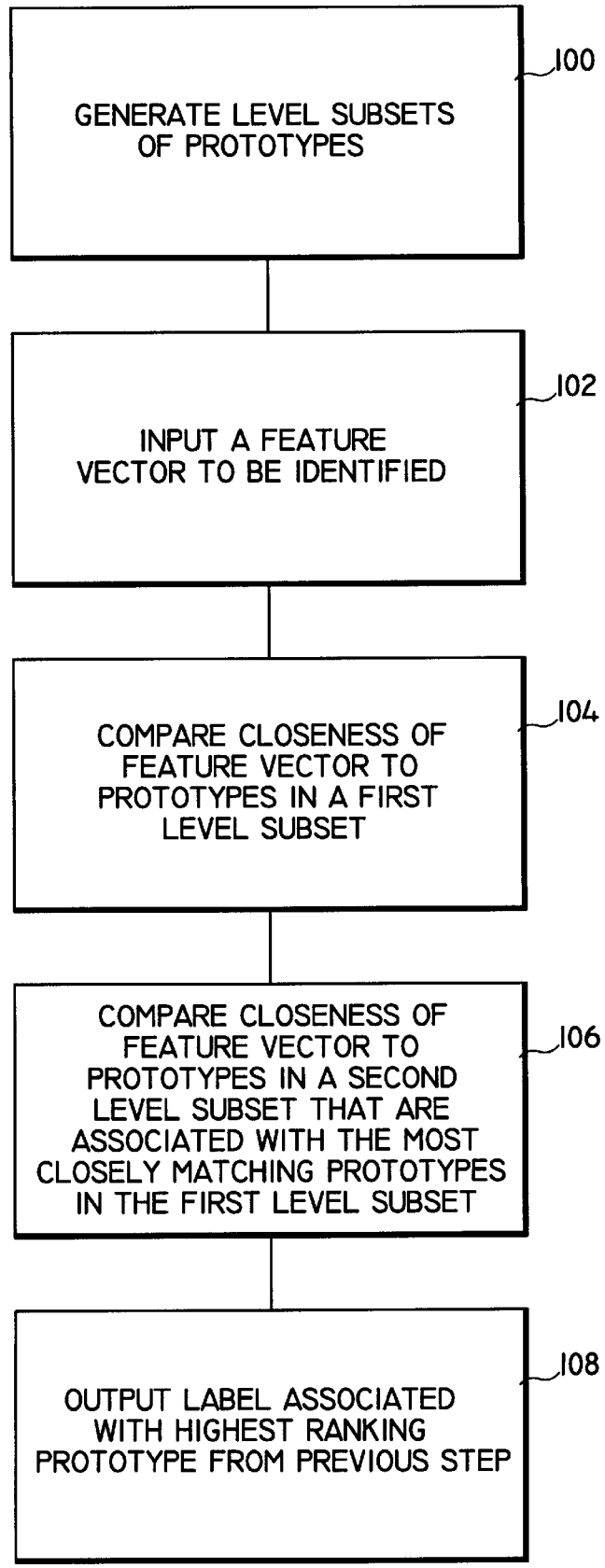
FIG. 2 is a flow diagram describing a method in accordance with the invention.

FIG. 1 is a block diagram of an example of a speech coding apparatus according to the invention and FIG. 2 is a flow diagram of a method in accordance with the invention. The speech coding apparatus of FIG. 1 comprises an acoustic feature value measure 10 for measuring the value of at least one feature of an utterance during each of a series of successive time intervals to produce a series of feature vector signals representing the feature values. The acoustic feature value measure 10 may, for example, measure the amplitude of an utterance in each of twenty frequency bands during each of a series of ten-millisecond time intervals to produce a series of twenty-dimension feature vector signals representing the amplitude values.

The speech coding apparatus further comprises a prototype vector signal store 12 storing a plurality of prototype vector signals. Each prototype vector signal has at least one parameter value and has a unique identification value. The prototype vector signals in prototype vector signals store 12 may be obtained, for example, by clustering feature vector signals from a training set into a plurality of clusters. The mean (and optionally the variance) for each cluster forms the parameter value of the prototype vector. The prototype vectors also have an attribute associated therewith referred to as priors. Priors give the probability of the occurrence of any particular prototype of the training set.

In accordance with an exemplary form of the invention, the system includes a first level subset prototype vector signals store 12a, and a second level subset prototype vector signals store 12b. The number of prototypes stored in store 12b is less than the number stored in store 12 and the number stored in store 12a is less than the number stored in store 12b. As previously mentioned, although the embodiments illustrated in and discussed in relation to FIGS. 1 and 2 depict only three levels for exemplary purposes, the present invention is not so limited and, rather, may accommodate M such hierarchical levels.

Each prototype vector signal in the first level subset store 12a may be associated with two or more prototype vectors in the second level subset store 12b, where each second subset prototype vector signal preferably contains a full set of parameter values.

In general, the speech coding apparatus according to the present invention can obtain a significant reduction in computation time while maintaining acceptable labeling accuracy. In a preferred embodiment, such advantages may be achieved, for example, when each subsequent subset i of prototype vector signals preferably contains approximately 10–20 times the total number of prototype vector signals in the preceding subset. For a preferred system with approximately 20,000 prototypes, acceptable results can be obtained, for example, when the average number of prototype vector signals in the first level subset store 12a is preferably between approximately 128 and approximately 256 and in the second level subset store 12b is preferably between approximately 2048 and approximately 4096.

The speech coding apparatus further comprises a comparator 18. Comparator 18 compares the closeness of the feature value of the first feature vector signal (input in step 102 of FIG. 2) to the parameter values of the prototype vector signals in the first level subset prototype vector signal store 12a, to generate a ranked list of closest matching prototypes (step 104 in FIG. 2). Each of the prototypes in the first prototype store is associated with a plurality (i.e., two or more) of prototypes in the second prototype subset store 12b. The feature values of the first feature vector signal are then compared with each prototype in the second subset that is associated with the highest ranking prototypes in the first subset of prototype vector signals to obtain prototype match scores for the first feature vector signal and each such associated prototype vector signal in the second level subset (step 106 in FIG. 2). A score is the result of calculating the likelihood of the Gaussian distribution for a particular prototype and a particular feature vector. Each prototype in the second level subset prototype vector signals store 12b is associated with a plurality (i.e., two or more) of prototypes in prototype vector signals store 12. The comparator compares the feature values of the first feature vector signal with each prototype in prototype vector signals store 12 associated with the highest ranking second level subset prototypes, and an output 20 outputs at least the identification value of at least the prototype vector signal from store 12 having the best prototype match score as a coded utterance representation signal associated with the first feature vector signal (step 108 in FIG. 2).

By comparing the closeness of the feature value of a feature vector signal to the parameter values of only the prototype vector signals in the second subset that are associated with the highest ranking prototype vector signals in the first subset, a significant reduction in computation time is achieved. However, by then comparing the closeness of the feature value of the feature vector signal to the parameter values of only the prototype vector signals in the prototype vector signals in store 12 associated with the highest ranking prototype vector signals in the second subset, yet a further significant reduction in computation time is achieved.

A hierarchical labeler in accordance with the invention quickly identifies the top K ranks of prototype vectors, that is, the K ranks having the highest likelihood of matching the current feature vector.

In accordance with one aspect of the invention, M subset levels of prototypes are constructed (e.g., step 100 in FIG. 2), each of the subset levels having $N_k$ prototypes, where $k \in (1, \ldots M)$. The prototypes in these subset levels are chosen in such a way that a prototype in the k-1 subset level is associated with the $$\frac{N_k}{N_{k-1}}$$

closest prototypes in the level k. The process of choosing and determining the closest prototype is described below.

The lowest (i.e., target) level of the M levels contains all $N_M$ target prototypes, i.e., all possible prototypes for which the system has been trained.

To find the best L prototypes in the target level M, likelihoods are successively calculated starting from the top level k=1. In the top level, log-likelihoods for all $N_1$ prototypes in that level are calculated, and the results sorted. The log-likelihood is defined as the probability that the parameter values of a prototype vector signal match the feature values of a feature vector signal under consideration. Starting with the best prototype from the sorted list, i.e., the one with the highest log-likelihood, a list of prototypes in level k+1 is generated until the top $N_{k+1,actv}$ active prototypes are obtained. More specifically, there are a number $$\left(\text{approximately} \frac{N_k}{N_{k-1}}\right)$$

of prototypes in level k+1 that are associated with each prototype in level k. The active prototypes in level k+1 comprise the prototypes in level k+1 that are associated with the best prototype in level k, the prototypes in level k+1 associated with the next best prototype in level k, and so on, until a total of $N_{k+1,actv}$ prototypes have been compiled. This newly created list represents the prototypes from level k used for calculating further log-likelihoods. These are the "active" prototypes from that level. Thus, the log-likelihood for all prototypes in the level need not be calculated, but rather for active prototypes only. In the same way, the method continues through the next levels by performing the following steps: calculate the log-likelihood for $N_{k,actv}$ prototypes; sort log-likelihoods and find $N_{k,best}$, where $N_{k,best}<N_{k,actv}$; expand to $N_{k+1,actv}$ prototypes; and continue to next level.

The previous steps are repeated until the lowest level M is reached and the $L=N_{m,best}$ prototypes are identified. It is to be appreciated that the total number of prototypes in a level, except the top level k, need not be enumerated.

The following is an illustrative example of the procedure of the invention described above. Given a system where M=3, $N_1$=128, $N_2$=2048 and $N_3$=20000, the task is to identify $N_{3,best}$=500 best prototypes. To estimate a set of best prototypes for a current acoustic vector we first calculate, as will be explained below, the $N_{1,best}$ prototypes in the top level. They point to a new set of prototypes in the second level $N_{2,actv}$, where:

$$N_{2,actv} \approx \frac{N_2}{N_1} N_{1,best} \quad (1)$$

and where $N_{2,actv}$ is the average number of active prototypes in level 2.

If $N_{2,actv}$ is limited to 500, and if $N_{3,actv}$ is also limited to 500, then the total number of calculated log-likelihoods is $$C_{tot}=N_1+N_{2,actv}+N_{3,actv}=128+500+500=1128 \quad (2)$$

Significantly, the number of calculations to obtain the best 500 prototypes in accordance with the present invention is considerably less as compared to the case of the full search labeler of the prior art. One calculation in this sense may be a distance enumeration. The total computational complexity will, consequently, depend on the distance measure.

Another aspect of the invention is to limit the number of active prototypes in a level by calculating and then utilizing the difference between the loglikelihood of the best prototype minus a predetermined threshold th:

$$\text{LogLik}_{min}=\text{LogLik}_{bestprot}-\text{th} \quad (3)$$

All the prototypes with a likelihood higher than $\text{LogLik}_{min}$ will be best prototypes.

For example, the threshold may be set to a value such as 12 in all levels. It is to be appreciated that the threshold is used instead of a fixed number of best prototypes, such as 500 as in the example above. When the number of best prototypes is limited by the threshold, the number of best prototypes determined is adjusted to adapt to how well the feature vectors are actually describing the current piece of speech under consideration. The number 500 is actually an overestimation for speech where the feature vectors discriminate the speech well. This adaptive approach therefore saves even further computation effort.

The log-likelihood thresholding will produce a larger number of active prototypes if the log-likelihoods of the best prototypes decrease slowly, and a smaller number if they decrease rapidly. This is intuitively what is desired to be achieved. The small slope manifests uncertainty in differentiation, which means that inspecting a larger number of prototypes increases the probability of obtaining the right ones. On the other hand, a steep slope indicates that some prototype fits the feature vector signal very well and the probability of selecting the correct one is high, in which case a lower number of prototypes to inspect are obtained. The thresholding provides an automatic mechanism for inspecting more prototypes where the uncertainty is greater and fewer where the discrimination is strong. The best performance in terms of accuracy and speed is obtained by combining the threshold with a maximum number of prototypes per level.

Clustering

The procedure for determining the $N_1$ and $N_2$ level prototypes will now be described. Top-down clustering is used for generating M hierarchical level subsets for the labeler. In a preferred embodiment, there are three levels of subsets of prototypes in the labeler: the first level preferably has approximately 128–256 prototypes; the second level preferably has approximately 1000–4000 prototypes; and the third level preferably includes all the target prototypes. A hierarchical, clustering, top-down algorithm is used to construct the first and second level subsets. The target prototypes serve as a training sequence. In a preferred embodiment, the number of target prototypes is approximately 20,000–50,000.

The clustering algorithm preferably uses a top-down, k-means algorithm with splitting and Kullback-Leibler distance measure. In a first step, an n-dimensional diagonal Gaussian distribution is generated for all target prototypes. Thus, the first Gaussian density distribution is a single prototype representing the whole training sequence. It is computed simply by taking sums and squared sums for all n-dimensions. The new means and variances are estimated as averages. K-means clustering is repeated on all target prototypes several times (e.g., 5–15 times), until the k-means clustering algorithm converges. It is to be appreciated that the clustering process performed by the k-means clustering algorithm involves measuring the average distance between the training vectors and the prototype vectors. As the process progresses through each iteration, the average distance between the training vectors and the prototype vectors decreases. Preferably, after between approximately 5 to 15 iterations, at which time there is no appreciable decrease in the distance between the training vectors and the prototype vectors, the k-means clustering process is said to have converged. Convergence is preferably the stopping criteria for the k-means clustering algorithm. Thus, once the k-means clustering algorithm converges, the prototype vectors for the first level are determined.

In determining the prototype vectors for the next (second) level, which will preferably be double the quantity from the previous level, the clustering algorithm begins by utilizing the prototypes generated for the first level. Then, the remainder of the new prototypes for this next level are derived from the prototypes of the previous level by adding a small value δ to all means and subtracting a small value δ from all variances. To refine the new set of prototypes for this next level (which is preferably double the quantity from the previous level), the k-means clustering process is iteratively (e.g., approximately between 5 to 15 times) run again.

The preferred prototype vector generation procedure for each hierarchical level may be summarized by the following steps:

1. Initialization: all the sums $m_i$ and square of the sums $m_i^{(2)}$ are zeroed. Estimate one n-dimensional diagonal Gaussian distribution (code book prototype) of size $N_1=1$ for the training sequence.
2. Split the $M_k$ prototypes such that $$m_i = m_i \quad (4)$$

$$v_i = v_i \quad (5)$$

$$m_{M_{k+i}} = m_i + \frac{m_i}{\delta} \quad (6)$$

$$v_{M_{k+i}} = v_i + \frac{vi}{\delta} \quad (7)$$

$$i \in (0, \ldots, M_k)$$

where m represents a mean value and v represents a variance value and, preferably, the δ is approximately 30. This makes the size of the level $M_k=2*M_{k-1}$, i.e., twice as large as before splitting.

3. For each training prototype (i.e., all target prototypes)
   a) find the closest diagonal Gaussian using the Kullback-Leibler measure:

$$E(\epsilon(x)) = \frac{1}{2}\sum_{i=1}^{n}\left[\ln\frac{v_{a,i}}{v_{b,i}} + \frac{(\mu_{a,i}-\mu_{b,i})^2}{v_{a,i}} + \frac{v_{b,i}}{v_{a,i}} - 1\right] \quad (8)$$

where E represents the expected value, $\mu$ represents the mean value, and v represents the variance value.
   b) for the closest Gaussian density distribution of a vector i and and an element j, accumulate the sum $m_{i,j}$ of means $\mu_{i,j}$, the sum of squares $m_{i,j}^2$ of squared means $\mu_{i,j}^2$ and counts $c_i$:

$$m_{i,j}=m_{i,j}+\mu_{i,j} \quad (9)$$

$$m_{i,j}^2=m_{i,j}^2+\mu_{i,j}^2 \quad (10)$$

$$c_i=c_i+1 \quad (11)$$

c) update the means and variances:

$$\mu_{i,j} = \frac{m_{i,j}}{c_i} \quad (12)$$

$$v_{i,j} = m_{i,j}^2 + \frac{m_{i,j}^2}{c_i} - \mu_{i,j}^2 \quad (13)$$

d) repeat steps (a–c) from preferably approximately 5 to approximately 15 times or until the stopping criteria (e.g., convergence) is substantially achieved;
4. If the desired number of levels has been generated, then stop; else go to step 2 and repeat steps 2 through 3.

Predictive Labeling

To further decrease the number of evaluated prototypes, recognition is given to the fact that adjacent feature vectors have high correlation. If the distance between two adjacent feature vectors is less than some predetermined threshold, it is very probable that the list of prototypes for the lowest level (target prototypes) for one of the feature vectors will be the same or similar to the list for the other feature vectors. In such a case, the ranks for the one feature vector can be found based on the list generated for the other feature vectors. For the case of a three level labeler with 128 prototypes in the top level and the number of calculated prototypes in level 2 and 3 equal to 500, approximately 500+128=628 calculations may advantageously be saved, which is more than a 50% reduction in calculations over prior art labelers. Significantly, this speedup does not typically decrease the recognition rate.

Quantized Ranks

As the number of calculated ranks (list of ordered closest leaves) decreases, the recognition rate naturally decreases. Thus, if the minimum number of accepted ranks is approximately 300 then a significant number of prototypes must be evaluated in the second and third level, but the efficiency of the labeler decreases. On the other hand, the precision of the ranks at the lower portion of each list does not need to be substantially high. Therefore, the higher levels in the hierarchical labeler may be used to estimate the ranks of the lower levels.

It should be noted that each level subset makes better and better estimates of the closest leaves to the current feature vector signal. The number of closest leaves, and the prototypes pointed to, is narrowed down level by level. The actual calculation is performed based on prototypes, and not on leaves. A map is preferably used to point through levels and link the prototypes to leaves.

When increasing the number of leaves for which we can set the ranks, the first level subset in the labeler is preferably used. The top N active prototypes from the first level subset point to a larger number of leaves than the top n prototypes from the target level. The best prototype points with high probability to the best leaves for the particular feature vector signal. These leaves must have a higher rank than the leaves pointed to by the second best prototype, and so on. The top N prototypes point to a total of M active leaves. To estimate the probable rank of the leaves, the total number of active leaves M is calculated. This can be approximated by summing the number of leaves pointed to by each of the top N prototypes:

$$M = \sum_{i=0}^{N_{actv}} m_{P_i} \quad (14)$$

where $m_{p_i}$ is the number of leaves pointed to by prototype $P_i$. The rank of a set of leaves pointed to by the best prototype is estimated to be:

$$r=m_{1_t}+m_{P_{top}}\div 2 \quad (15)$$

where the $m_{1_t}$ is the number of active leaves and $m_{P_{top}}$ refers to the closest (best) prototypes.

The lists of $m_{P_i}$ leaves are overlapping and, consequently, the implementation of the algorithm must start with setting the ranks (worst leaves) from the worst prototype. If the better prototype points to the same leaf as some of the worse prototypes, its rank is overwritten.

Band Quantizer

The hierarchical labeler of the present invention as described above reduces the number of computations by decreasing the number of potential prototypes. The unique labeler estimates the likelihood of a feature vector only for relevant prototypes. The CPU requirements associated with the labeler of the present invention may be further reduced by simplifying the calculation of the n-dimensional diagonal Gaussian likelihood.

The prototypes cover the feature vector space, and there is a large similarity between neighboring prototypes. In particular, similarity can be observed across elements (dimensions), meaning that there are many prototypes which have very similar Gaussian distributions for the first element, second element or groups of elements. In a preferred embodiment, the prototypes have 39 elements or are said to be 39-dimensional. Some of the prototypes differ significantly only in a few elements. If the prototypes are split into bands of pairs (or triplets or any number of combined elements from feature vectors), a high level of resemblance between bands can be observed. This allows the number of Gaussian distributions, which describe bands, to be reduced. This can be done using a clustering technique (e.g., clustering of the target prototypes).

For the purposes of the following discussion, Gaussian density distributions representing bands will be referred to as atom prototypes or simply just atoms. The number of atom prototypes per band will be much smaller than the total number of the target prototypes, while preserving good accuracy. Typically, it has been found during experiments that 20,000 target prototypes can be preferably represented with approximately 20 bands of pairs of elements and approximately 64 atom prototypes without losing appreciable recognition accuracy.

The prototypes in the levels and the target prototypes are stored in memory as indexes to atom prototypes. Consequently, the size of the required memory is much smaller. For example, 20,000 39-dimensional prototypes typically require 20,000 means and 20,000 variances, represented in four bits for each element. For band quantized prototypes, in accordance with the present invention, only 20,000 ties the number of bands (i.e., 20,000×number of bands) of indexes are required, each index being preferably less than one byte long. The 39 elements of the prototypes are typically replaced with 20 bands. That is, every pair of elements is replaced by one atom. The memory required when the means and variances are used for one element is 312 (39×2×4) bytes. For prototypes, only 20 (20×1) bytes of indexes are needed. The quantized prototypes are, in essence, only indexes to atoms. The larger the number of prototypes, the greater the savings that is realized. Furthermore, this structuring enables faster computation of the log-likelihood. The log-likelihood for a feature vector signal is computed as a sum of precomputed partial log-likelihoods for atoms prototypes.

The calculation of log-likelihoods for a set of prototypes is performed in two steps. In a first step, the partial log-likelihoods for atom prototypes are calculated. In a second step, the prototype log-likelihood is given as a sum of partial log-likelihoods. It is to be appreciated that the savings in calculations depends on the total number of prototypes, number of bands and number of atoms per band.

For a very large number of prototypes (e.g., 100,000), it is convenient to use hierarchical bands. The target prototypes are represented by several levels of bands. The first level may have only two or three bands. Band prototypes will be represented, in turn, by bands. Each level of bands will have a considerably smaller number of atom prototypes. For example, approximately 100,000 prototypes will be represented by approximately 3*2,000 atom prototypes and the second level from each of the approximately 2,000 prototypes will be represented by approximately 7 bands. Then the total number of indexes in memory is approximately:

$$100{,}000*3*2+3*2{,}000*7=642{,}000 \tag{16}$$

where 100,000 is the number of prototypes, 3 is the number of bands in the first level, 2 is the number of bytes for pointing to atom prototypes, 2,000 is the number of prototypes represented by seven bands and pointed to by one byte indexes. If, for example, only one level with 20 bands is used, then the storage requirement is approximately:

$$100{,}000*20=2{,}000{,}000. \tag{17}$$

Experimental Results

The following tables present results showing the effect of clustering and quantization on the error rate of a discrete, speaker independent, large vocabulary task. The total number of prototypes is 20,000 and the base line error with the full search labeler is 2.7%. Tables 1, 2 and 3 show the error rate for different numbers of prototypes in $l_2$. The parameters $n_{12}$ and $n_{13}$ are the maximum number of prototypes expanded from the previous level. For example, in the first table there are 512 prototypes in level 1 and the first column shows the error rate if the top n prototypes are expanded to 1000 prototypes for $l_2$. The rows in the table show limits of the number of prototypes in the third level $l_3$.

The smaller the number of prototypes $N_1$ and $H_2$ that are chosen, the faster the calculation; on the other hand, the recognition error increases. The number of active prototypes in the third level can not be decreased much further because, approximately, the top 100 ranks must be produced. If it is assumed that there are approximately 2000 leaves, this means that there are, on the average, approximately 10 prototypes per leaf.

Tables 1, 2 and 3 show results for a three-level hierarchical labeler with full precision of the prototypes. Tables 4 and 5 show the results for quantized prototypes in 20 bands with 64 atoms.

Table 1 shows results for $l_1$=512 and $l_2$=4096.

TABLE 1

| nl2 | 1000 | 900 | 800 | 700 | 600 | 500 | 250 |
|---|---|---|---|---|---|---|---|
| 1000 | 2.71 | 2.68 | 2.68 | 2.66 | 2.66 | 2.71 | 2.98 |
| 900 | 2.80 | 2.80 | 2.77 | 2.75 | 2.80 | 2.74 | 2.99 |
| 800 | 2.81 | 2.81 | 2.83 | 2.80 | 2.80 | 2.83 | 3.07 |
| 700 | 2.93 | 2.96 | 2.95 | 2.90 | 2.84 | 2.92 | 3.02 |
| 600 | 3.04 | 3.05 | 3.02 | 3.01 | 3.04 | 2.99 | 3.15 |
| 500 | 3.02 | 3.07 | 3.07 | 3.08 | 3.11 | 3.10 | 3.29 |

TABLE 2

$l_1$ = 256, $l_2$ = 4096

| nl2 | 1000 | 900 | 800 | 700 | 600 | 500 | 250 |
|---|---|---|---|---|---|---|---|
| 1000 | | | | | | | |
| 900 | | | | | | | |
| 800 | | | | | | | |
| 700 | | | | | | 2.87 | 2.92 | 3.02 |
| 600 | | | | | | 2.93 | 3.01 | 3.08 |
| 500 | | | | | | 3.05 | 3.04 | 3.24 |

TABLE 3

$l_1 = 128, l_2 = 4096.$

| nl2 | 1000 | 900 | 800 | 700 | 600 | 500 | 250 |
|---|---|---|---|---|---|---|---|
| 1000 | | | | | | | |
| 900 | | | | | | | |
| 800 | | | | | | | |
| 700 | | | | | | 2.95 | 2.93 | 3.17 |
| 600 | | | | | | 3.07 | 3.07 | 3.24 |
| 500 | | | | | | 3.16 | 3.26 | 3.53 |

The next two tables show the band quantization error rate 20 bands/

TABLE 4

64 atoms $l_1 = 256, l_2 = 4096.$

| nl2 | 1000 | 900 | 800 | 700 | 600 | 500 | 250 |
|---|---|---|---|---|---|---|---|
| 1000 | | | | | | | |
| 900 | | | | | | | |
| 800 | | | | | | 3.07 | 2.90 | 2.95 |
| 700 | | | | | | 3.33 | 3.16 | 3.13 |
| 600 | | | | | | 3.51 | 3.32 | 3.48 |
| 500 | | | | | | | | |

TABLE 5

20/64 atoms, $l_1 = 128, l_2 = 4096.$

| nl2 | 1000 | 900 | 800 | 700 | 600 | 500 | 250 |
|---|---|---|---|---|---|---|---|
| 1000 | | | | | | | |
| 900 | | | | | | | |
| 800 | | | | | | 3.10 | 3.16 | 3.21 |
| 700 | | | | | | 3.24 | 3.30 | 3.33 |
| 600 | | | | | | 3.39 | 3.42 | 3.53 |
| 500 | | | | | | | | |

What is claimed is:

1. A method for assigning a label to a segment of speech to be recognized, comprising the steps of:

providing a hierarchical fast ranking tree comprising a plurality of levels of subsets of prototypes, each prototype in a higher level subset being associated with one or more prototypes in a lower level subset;

inputting a feature vector signal representing the segment of speech to be recognized;

comparing the features of the vector signal with the features of the prototypes in a first level to find a first ranked list of the closest prototypes to the feature vector signal at that level;

comparing the features of the feature vector signal to the prototypes in a second level subset associated with the highest ranking prototypes in the first ranked list of prototypes, to find a second ranked list of the closest prototypes to the feature vector signal in the second level;

assigning the label associated with the highest ranking prototype in the lowest level subset to the feature vector signal; and predictive labeling wherein the highest ranking prototype in the lowest level subset is assigned to a second feature vector signal which represents another segment of speech to be recognized if a distance between the second feature vector signal and the first feature vector signal is at least less than a predetermined threshold.

2. The method as claimed in claim 1, further comprising comparing the features of the feature vector signal to the prototypes in a third level subset associated with the highest ranking prototypes in the second ranked list of prototypes, to find a third ranked list of the closest prototypes to the feature vector signal in the third level.

3. The method as claimed in claim 2, wherein prototypes are arranged in the plurality of levels by:

organizing all prototypes in an existing set of a large number of prototypes into a binary search tree terminating in a plurality of leaves by splitting all prototypes into at least two sets of prototypes based upon a Kullback-Leibler distance measure;

continuing to split the set of prototypes until every leaf of the tree represents one prototype; and assigning the prototypes in the lowest level of the tree to the third level subset, the prototypes in a higher level of the tree to the second level subset, and the prototypes in a next higher level of the tree to the first level subset.

4. The method as claimed in claim 1, wherein the second feature vector signal is approximately adjacent to the first feature vector signal.

5. The method as claimed in claim 1, wherein a leaf refers to a group of closest prototypes and a rank refers to a list of ordered closest leaves.

6. The method as claimed in claim 5, wherein each level of the hierarchical fast ranking tree has at least one rank associated therewith.

7. The method as claimed in claim 5, wherein ranks calculated for higher levels of the hierarchical fast ranking tree are used to estimate ranks for the lower levels of the hierarchical fast ranking tree.

8. The method as claimed in claim 1, wherein each prototype includes a plurality of elements, each element being represented by a Gaussian density distribution including a mean value and a variance value.

9. The method as claimed in claim 8, further comprising the step of respectively splitting the prototypes into bands wherein each band contains the mean and the variance values of at least two elements of the particular prototype having substantially similar Gaussian density distributions with respect to each other.

10. The method as claimed in claim 9, wherein each prototype has approximately 39 elements whereby the elements may be grouped into approximately 20 bands.

11. The method as claimed in claim 10, wherein each band may be represented by an index.

12. A speech coding apparatus comprising:

means for measuring the value of at least one feature of an utterance during each of a series of successive time intervals to produce a series of feature vector signals representing the feature values;

first level subset means for storing a first plurality of prototype vector signals, each prototype vector signal having at least one parameter value and a unique identification value;

second level subset means for storing a second plurality of prototype vector signals, each prototype vector signal having at least one parameter value and a unique identification value, and each second level subset prototype vector being associated with one of the prototype vector signals in the first level subset means;

means for comparing the closeness of the feature value of the first feature vector signal to the parameter values of the prototype vector signals in the first level subset means to obtain prototype match scores for the first feature vector signal and each prototype vector signal in the first level subset means;

means for comparing the closeness of the feature value of the first feature vector signal to the parameter values of the prototype vector signals in the second level subset means associated with the prototypes in the first level subset means that most closely match the feature value of the first vector signal;

means for outputting at least the identification value of at least the prototype vector signal in the second level subset means having the best prototype match score as a coded utterance representation signal of the first feature vector signal; and means for predictive labeling wherein the highest ranking prototype in the lowest level subset is assigned to a second feature vector signal which represents another segment of speech to be recognized if a distance between the second feature vector signal and the first feature vector signal is at least less than a predetermined threshold.

13. The speech coding apparatus as claimed in claim 12, wherein:

the measuring means measures the values of at least two features of an utterance during each of a series of successive time intervals to produce a series of feature vector signals representing the feature values; and a scalar function of a feature vector signal comprises the value of only a single feature of the feature vector signal.

14. The speech coding apparatus as claimed in claim 13, characterized in that the measuring means comprises a microphone.

15. The speech coding apparatus as claimed in claim 14, wherein the measuring means comprises a spectrum analyzer for measuring the amplitudes of the utterance in two or more frequency bands during each of a series of successive time intervals.

16. The speech coding apparatus as claimed in claim 12, wherein each prototype includes a plurality of elements, each element being represented by a Gaussian density distribution including a mean value and a variance value.

17. The speech coding apparatus as claimed in claim 16, further comprising the step of respectively splitting the prototypes into bands wherein each band contains the mean and the variance values of one or more elements of the particular prototype having substantially similar Gaussian density distributions with respect to each other.

18. The speech coding apparatus as claimed in claim 17, wherein each prototype has approximately 39 elements whereby the elements may be grouped into approximately 20 bands.

19. The speech coding apparatus as claimed in claim 18, wherein each band may be represented by an index.

20. A speech coding method comprising:

measuring the value of at least one feature of an utterance during each of a series of successive time intervals to produce a series of feature vector signals representing the feature values;

storing a first plurality of prototype vector signals as a first level subset of prototype vectors, each prototype vector signal having at least one parameter vector and a unique identification value;

storing a second plurality of prototype vector signals, greater than the first plurality, as a second level subset of prototype vectors;

comparing the closeness of the feature vector of the first feature vector signal to the parameter vectors of the prototype vector signals in the first level subset to obtain a ranked list of prototypes most closely matching the first feature vector signal;

comparing the closeness of the feature vector of the parameter vectors of the prototype vector signals in the second level subset that are associated with the prototype vectors in the first level subset that most closely match the first feature vector signal to obtain a ranked list of prototypes in the second level subset most closely matching the first feature vector signal;

outputting at least the identification value of at least the prototype vector signal in the second level subset, that is associated with a prototype vector in the first level subset, having the best prototype match score as a coded utterance representation signal of the first feature vector signal; and predictive labeling wherein the highest ranking prototype in the lowest level subset is assigned to a second feature vector signal which represents another segment of speech to be recognized if a distance between the second feature vector signal and the first feature vector signal is at least less than a predetermined threshold.

21. A speech coding method as claimed in claim 20, wherein the second level subset includes a number of prototypes greater than the number in the first level subset.

22. A speech coding method as claimed in claim 21, wherein:

the step of measuring comprises measuring the values of at least two features of an utterance during each of a series of successive time intervals to produce a series of feature vector signals representing the feature values; and a scalar function of a feature vector signal comprises the value of only a single feature of the feature vector signal.

23. A speech coding method as claimed in claim 22, wherein the step of measuring comprises measuring the amplitudes of the utterance in two or more frequency bands during each of a series of successive time intervals.

* * * * *